(12) United States Patent
Cao et al.

(10) Patent No.: US 10,229,105 B1
(45) Date of Patent: Mar. 12, 2019

(54) MOBILE LOG DATA PARSING

(71) Applicant: EMC Corporation, Hopkinton, MA (US)

(72) Inventors: Yu Cao, Beijing (CN); Baoyao Zhou, Beijing (CN); Yuxi Sun, Beijing (CN); Demetrios Fanourgiakis, Toronto (CA); Min Zhu, Sichuan (CN); Lifeng Gao, Sichuan (CN); Qiaomu Shen, Sichuan (CN); Mengying Li, Sichuan (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 175 days.

(21) Appl. No.: 14/502,614

(22) Filed: Sep. 30, 2014

(51) Int. Cl.
 *G06F 17/30* (2006.01)
 *G06F 17/27* (2006.01)
 *G06F 7/24* (2006.01)

(52) U.S. Cl.
 CPC ............ *G06F 17/2705* (2013.01); *G06F 7/24* (2013.01)

(58) Field of Classification Search
 CPC ......... G06F 17/30525; G06F 17/30312; G06F 17/30575; G06F 17/30908; G06F 17/40
 USPC ....... 707/696, 648, 707, 682–684, 962, 708, 707/755, 771
 See application file for complete search history.

(56) References Cited

U.S. PATENT DOCUMENTS

| | | | | |
|---|---|---|---|---|
| 6,047,353 A * | 4/2000 | Vishlitzky | ........... | G06F 11/3495 711/111 |
| 6,144,999 A * | 11/2000 | Khalidi | ............... | G06F 11/2074 709/219 |
| 6,163,856 A * | 12/2000 | Dion | .................... | G06F 11/2071 709/213 |
| 6,366,917 B1 * | 4/2002 | St. John Herbert, III | ................... | G06F 17/30595 |
| 7,222,136 B1 * | 5/2007 | Brown | .............. | G06F 17/30368 707/683 |
| 7,853,621 B2 * | 12/2010 | Guo | ........ | G06F 19/321 707/803 |
| 7,895,137 B2 * | 2/2011 | Salahshour | ............. | G06F 9/542 706/12 |
| 7,921,080 B2 * | 4/2011 | Taylor | ................. | G06F 11/1458 707/622 |
| 8,478,800 B1 * | 7/2013 | Johnson | ................... | H04L 67/42 707/827 |
| 8,620,928 B1 * | 12/2013 | Walton | ................ | G06F 17/3053 707/748 |
| 8,874,610 B2 * | 10/2014 | Geroulo | ........... | G06F 17/30286 707/688 |
| 2003/0217033 A1 * | 11/2003 | Sandler | ............ | G06F 17/30333 |
| 2005/0080803 A1 * | 4/2005 | Sauermann | ........ | G06F 17/30569 |
| 2006/0085465 A1 * | 4/2006 | Nori | ................... | G06F 17/30297 |
| 2007/0203925 A1 * | 8/2007 | Sandler | ............ | G06F 17/30333 |
| 2013/0024371 A1 * | 1/2013 | Hariramani | ............ | G06Q 20/36 705/41 |
| 2014/0024371 A1 * | 1/2014 | Lair | ....................... | H04W 48/08 455/435.1 |

(Continued)

*Primary Examiner* — Daniel A Kuddus
(74) *Attorney, Agent, or Firm* — Andre Gibbs; Krishnendu Gupta

(57) ABSTRACT

A computer-executable method, computer program product, and system for parsing a data log from a device, the computer-executable method comprising receiving the data log from the device, sampling the data log to create a sampled portion of data, wherein the sampled portion of data includes each attribute in the data log, constructing a metadata table based on the sampled portion of data, constructing data dictionaries based on the sampled portion of data, and parsing the data log using the metadata table and the data dictionaries to create a data field mapping table.

15 Claims, 9 Drawing Sheets

(56) References Cited

U.S. PATENT DOCUMENTS

| | | | |
|---|---|---|---|
| 2014/0114906 A1* | 4/2014 | Hegde | G06F 17/30557 707/602 |
| 2014/0280286 A1* | 9/2014 | Ganti | G06F 17/30554 707/766 |
| 2015/0234870 A1* | 8/2015 | Kumar | G06F 17/30315 707/807 |

* cited by examiner

MOBILE LOG DATA PARSING

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data processing.

BACKGROUND

With the development of information technology, more and more users are now using mobile devices to surf the Internet, resulting in the explosive growth of mobile device data. Mobile device data is valuable as it includes information associated with mobile devices, such as a user's mobile behavior, device type, web browser, device operation system, as well as the accessed web servers. By analyzing mobile device data, Internet and mobile vendors can improve their services quality and software/hardware competitiveness, and thus gain more market share. It would be beneficial for such companies to have a way for reducing the complexity of analyzing mobile data.

SUMMARY

A computer-executable method, computer program product, and system for parsing a data log from a device, the computer-executable method comprising receiving the data log from the device, sampling the data log to create a sampled portion of data, wherein the sampled portion of data includes each attribute in the data log, constructing a metadata table based on the sampled portion of data, constructing data dictionaries based on the sampled portion of data, and parsing the data log using the metadata table and the data dictionaries to create a data field mapping table.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
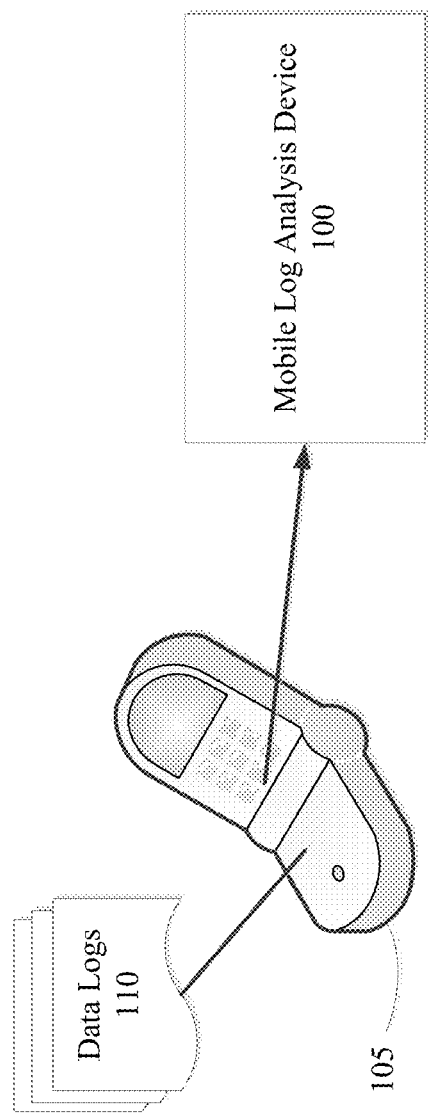
FIG. 1 is a simplified illustration of a mobile log analysis device analyzing data logs from a mobile device, in accordance with an embodiment of the present disclosure.

Traditionally, more and more users are now using mobile devices. Conventionally, mobile devices collect a multitude of data about users and the devices they use. Typically, analyzing and/or parsing the multitude of data collected by mobile devices is difficult. Generally, enabling a more efficient way of analyzing data from mobile devices would be beneficial to the data storage industry.

Conventionally, mobile log data parsing methods can be divided into two categories: brute-force and pattern recognition. Traditionally, in brute-force methods, all the keywords (i.e. data fields) of interest need to be stored in a database, and then the log data will be compared with the database. Typically, with the increase of keywords, both the efficiency and effectiveness of brute-force parsing methods decline sharply. Traditionally, pattern recognition methods directly extract unified abstract formulas out of mobile device logs. Conventionally, the algorithms adopted by pattern recognition methods are often complex, and the extraction process is usually time-consuming. Traditionally, conventional parsing methods have issues with low universality, as a slightly different data structure may require different treatment. Typically, conventional parsing methods have issues with low maintainability, as it is necessary to drastically change program code when the data changes. Conventionally, conventional methods have issues with low accuracy with frequent omission errors.

In many embodiments, the current disclosure may enable creation of a device that may be enabled to parse a mobile device's web access logs. In various embodiments, the current disclosure may enable a device to efficiently and effectively extract mobile device information and users' behaviors from mobile device data logs using a stepwise methodology to refine the data. In certain embodiments, according to the data characteristics, multiple techniques may be used to analyze semi-structured mobile log data. In most embodiments, the results of analyzed mobile log data may be returned in one of a plurality of forms. In some embodiments, results may be returned in the form of a two-dimensional table for advanced data analytics.

In many embodiments, mobile log data may be valuable as it records almost all information of mobile devices and users' web access behaviors. In various embodiments, mobile log data may include, but not limited to, device type, web browser, device operating system, as well as which web servers may have been accessed.

In many embodiments, the current disclosure may enable creation of a mobile log parsing method that may be applicable to a vast majority of log data, with high maintainability and strong scalability. In various embodiments, to resolve the scalability issue associated with brute-force methods, instead of saving all keywords into the data dictionaries, initial data dictionaries may be constructed for keywords that appear in the logs with high frequency. In certain embodiments, the parsing methodology may be enabled to continuously learn and/or update the dictionaries to make keywords more relevant to the data itself. In most embodiments, the method described may be enabled to control the total number of keywords to be extracted and thus may be enabled to ensure high efficiency. In various embodiments, by utilizing the data dictionary, parsing may be completed efficiently and keywords may be parsed accurately with adjustable priorities. In some embodiments, the current disclosure may enable incorporation of pattern recognition techniques into parsing techniques to ensure the integrity of information.

In certain embodiments, the following definitions may be useful:

Data Record: A mobile log file may be comprised of one or more Data Records, each of which may correspond to a time period from when a mobile device may get connected to the Internet. A data record may include information corresponding to the time period when a mobile device may get disconnected from the internet. A data record may contain all the relevant information associated with a mobile device's internet communications. In various embodiments, a data record may start with a timestamp (an integer) and may be separated from each other by one or more empty rows.

Attribute: A data record may contain one or more Attributes, include "time", "website", "mobile phone brand", "operating system", "browser", and/or other information associated with a mobile device. An attribute may include one or more possible attribute values, such as different websites.

Data Field: A data record may contain one or more data fields, each of which may describe semantically meaningful information in the form of values of attributes. In many embodiments, a data field may be divided into two parts. In these embodiments, the first part may be a field name and the second party may be the field value. In many embodiments, attributes values may be contained in the field values.

Simple Data Field: In a simple data field, the field value may contain the value of a single attribute. For example, in an embodiment, a simple data field "host" may only contain the URL of attribute "Website".

Complex Data Field: A Complex data Field, the field value may contain values of multiple attributes. For example, in an embodiment, the complex data field "user-agent" may contain values of attributes "mobile phone brand", "operating system", and "browser".

In many embodiments, a parsing procedure may include multiple steps. In most embodiments, the current disclosure may enable implementation of a parsing procedure for mobile device log data within an analysis module. In certain embodiments, a method of parsing mobile device data log may include 1) randomly sampling the original mobile device data log, 2) constructing a data field metadata table, 3) constructing initial data dictionaries, and 4) parsing the original mobile device data log and constructing the data field mapping table. In these embodiments, random sampling techniques may include, but not limited to, simple random sampling, stratified random sampling, systematic sampling, and/or cluster random sampling. In most embodiments, randomly sampling the original mobile device data log may include obtaining a randomly sampled mobile device log data, which may contain each of the attributes which may appear in the original mobile device data log. In various embodiments, a randomly sampled mobile device log may be representative in terms of the distribution characteristics among attributes.

In various embodiments, a data field metadata table may be constructed based on the randomly sampled mobile device log. In certain embodiments, a data field in a metadata table may contain one row for each type of data field (with a distinct field name) which may appear in the original mobile device log data. In most embodiments, information associated with a specific type of data field may include the number of attributes whose values appear in the data field, the concrete set of attributes, and whether this data field is simple or complex.

For example, in an embodiment, the following is an example of a data field metadata table.

TABLE 1

The Data Field Metadata table

| Field Name | Number of Attributes | Attributes | Category |
|---|---|---|---|
| . . . | . . . | . . . | . . . |
| $FN_i$ | 1 | $AN_{i1}$ | Simple |
| . . . | . . . | . . . | . . . |
| $FN_j$ | $l(l > 1)$ | $AN_{j1}, AN_{j2}, \ldots, AN_{jl}$ | Complex |
| . . . | . . . | . . . | . . . |

TABLE 2

An example of a partially populated data field metadata table

| Field Name | Number of Attributes | Attributes | Category |
|---|---|---|---|
| . . . | . . . | . . . | . . . |
| Host | 1 | Host | Simple |
| . . . | . . . | . . . | . . . |
| User-Agent | 3 | brand, OS, browser | Complex |
| . . . | . . . | . . . | . . . |

In many embodiments, a data field metadata table may be constructed according to industrial standards, such as RFC2616, and by semi-automatically analyzing the sample mobile device log data. In various embodiments, when using an industrial standard, the industrial standard may show the types of data fields as well as their complete set of attributes that may appear in the mobile device log data. In some embodiments, with common attribute values, the common attribute names may be known in advance. In most embodiments, a data record may contain distinct data fields. In various embodiments, it may be easy to derive a data field metadata sub-table for each data record in the sample mobile device log data. In certain embodiments, for each type of data field, the data fields may appear in different data records and may contain a different subset of attributes. In most embodiments, as a result, in the global data field metadata table, the set of attributes for each type of data field may be the union of the corresponding attribute's subsets in all sub-tables. In those embodiments, manual checking of the generated data field metadata table may be applied to ensure that all the attributes of a data field have been detected.

In most embodiments, construction of initial data dictionaries for complex data field types in the data field metadata table may be based on the randomly sampled mobile device log data. In various embodiments, the data dictionaries may be incrementally updated and may be utilized to parse the complex data fields of the original mobile device log data.

For example, in many embodiments, for m complex data field types $\{C_1, C_2, \ldots, C_m\}$ in the data field metadata table, an initial set of data dictionaries $\{D_{i1}, D_{i2}, \ldots, D_{in}\}$ may be constructed for each complex data field type $C_i$ with n attributes. In certain embodiments, instance data fields of the complex data field type $C_i$ may be extracted from the randomly sampled mobile device log data. In some embodiments, attribute values may be extracted from instance data fields by applying word segmentation and noise elimination techniques to filter out irrelevant information and record the number of times that an attribute value repeats.

In most embodiments, for an attribute $AN_{ij}$ of $C_i$, an attribute value may be chosen that repeats more than a predefined threshold. In various embodiments, relative priorities of the chosen attribute values of $AN_{ij}$ may be determined. In some embodiments, If attribute value $AV_1$ is compatible with or implies another attribute value $AV_2$, then $AV_1$ may be considered to have a higher priority than $AV_2$. In many embodiments, the parsing method may construct the initial data dictionary for $AN_{ij}$, with attribute values clustered by their priorities. In an embodiment, below is an example of a data dictionary.

TABLE 3

An example of a data dictionary

| Attribute | Host Data Field | Attribute values | | |
|---|---|---|---|---|
| | | Priority 1 | Priority 2 | ... |
| OS | User-Agent | {Android, Ubuntu, ... } | {Linux, ... } | ... |

In many embodiments, the parsing method may repeat the steps of 1) choosing attribute values that may repeat more than a predefined threshold, 2) determining relative priorities, and 3) constructing the initial data dictionary, with attribute values clustered by their priorities until all data dictionaries may be completed for a complex data type. In various embodiments, initial data dictionaries may be completed for each complex data type.

In many embodiments, parsing of mobile device log data may include parsing original data records and constructing data field mapping table. In many embodiments, a device may enable parsing data records $\{R_1, R_2, \ldots, R_m\}$ which may be contained in the original mobile device log data. In various embodiments, the analysis device may enable construction of the data field mapping table, as illustrated below, where each row may correspond to a distinct data record with its timestamp.

TABLE 4

Data field mapping table

| Time | $FN_1$ | $FN_2$ | ... | $FN_i$ | ... |
|---|---|---|---|---|---|
| T | $FV_1 = AV_{10}$ | $FV_2 = AV_{20}$ | ... | $FV_i = \{AV_{i1}, AV_{i2}, \ldots, AV_{il}\}$ | ... |

TABLE 5 an example of data field mapping table

| Time | ... | Host | ... | User-Agent | ... |
|---|---|---|---|---|---|
| 2012 Apr. 9 16:48 | ... | twitter | ... | {htc, Android, twitter} | ... |

Refer to the example embodiment of FIG. 1. FIG. 1 is a simplified illustration of a mobile log analysis device analyzing data logs from a mobile device, in accordance with an embodiment of the present disclosure. As shown, mobile device 105 includes data logs 110 and is in communication with mobile log analysis device 100. In many embodiments, a mobile device may include a cellular phone, tablet, laptop, and/or any other device that may be enabled to wirelessly communicate with the internet. Mobile Log analysis device 100 is enabled to extract data logs 110 from mobile device 105. Mobile log analysis device 100 is enabled to analyze extracted data and/or parse the extracted data to enable the extracted data to be more easily used. In many embodiments, a mobile log analysis device may be enabled to be directly connected to a mobile device to facilitate transfer for data. In various embodiments, a mobile log analysis device may be enabled to receive data wirelessly from a mobile device, using a format such as, but not limited to, Bluetooth, infrared, and/or other wireless communication methods.

Figure 2:
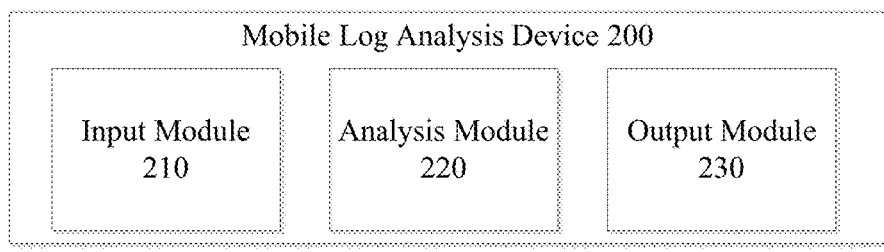
FIG. 2 is a simplified illustration of a mobile log analysis device, in accordance with an embodiment of the present disclosure.

Refer to the example embodiment of FIG. 2. FIG. 2 is a simplified illustration of a mobile log analysis device, in accordance with an embodiment of the present disclosure. As shown, mobile log analysis device 200 includes input module 210, analysis module 220, and output module 230. Input module 210 is enabled to receive mobile device log data from a mobile device and enabled to convert the mobile device log data into a readable format for analysis module 220. Input module 210 is enabled to send readable mobile device log data to analysis module 220 to execute parsing and/or analysis of readable mobile device log data. Once analysis is completed, analysis module 220 is enabled to send analysis data to output module 230. In many embodiments, an output module may be enabled to convert data into a plurality of formats. In certain embodiments, the plurality of formats may include a spreadsheet, database, and/or other data storage formats.

Figure 3:
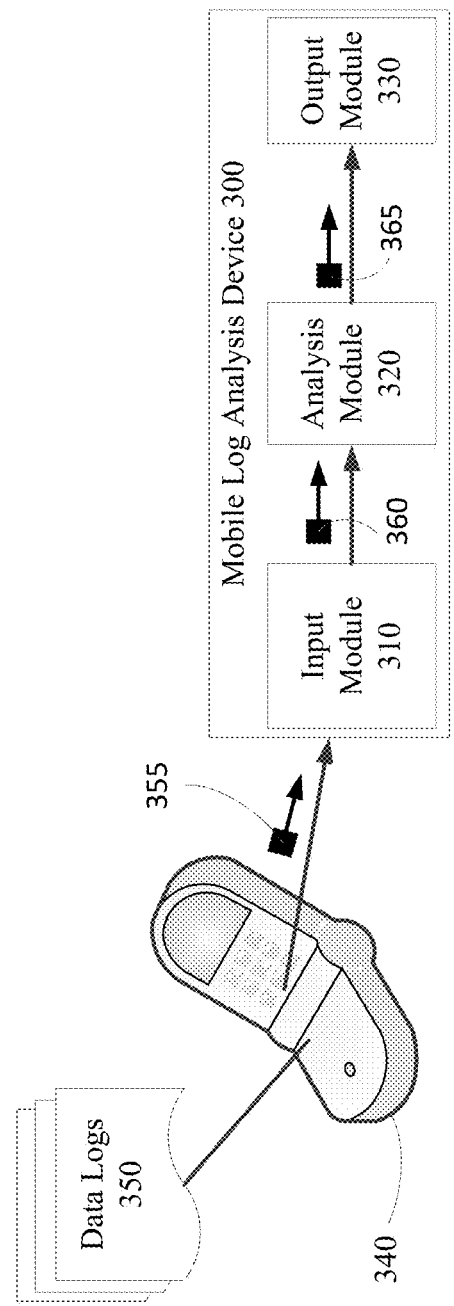
FIG. 3 is a simplified illustration of a mobile device in communication with a mobile log analysis device, in accordance with an embodiment of the present disclosure.

Refer to the example embodiment of FIG. 3. FIG. 3 is a simplified illustration of a mobile device in communication with a mobile log analysis device, in accordance with an embodiment of the present disclosure. As shown, mobile log analysis device 300 includes input module 310, analysis module 320, and output module 330. Data logs 350 are located within mobile device 340. Mobile device 340 is in communication with mobile log analysis device 300. input module 310, within mobile log analysis device 300, is enabled to receive data logs 350 from mobile device 340. Mobile device 340 is enabled to use message 355 to communicate data logs 350 to input module 310. Input module 310 is enabled to convert information from message 355 into a format readable by analysis module 320. Input module 310 sends readable data to analysis module 320 using message 360. Analysis module 320 is enabled to parse and/or analyze data received in message 360. Upon completing the analysis, Analysis module 320 is enabled to send the parsed and/or analyzed data to output module 330 using message 365.

Figure 4:
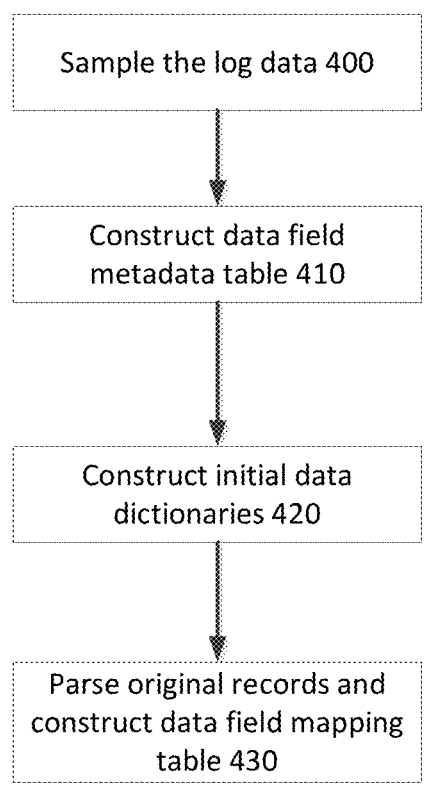
FIG. 4 is a simplified flowchart of a method of parsing mobile log data using the mobile log analysis device shown in FIG. 3, in accordance with an embodiment of the present disclosure.

Refer to the example embodiment of FIGS. 3 and 4. FIG. 4 is a simplified flowchart of a method of parsing mobile log data using the mobile log analysis device shown in FIG. 3, in accordance with an embodiment of the present disclosure. As shown in FIG. 4, mobile log analysis device 300 includes input module 310, analysis module 320, and output module 330. Mobile device 340 sends data logs 350 to input module 310 using message 355. Input module 310 sends received data logs to analysis module 320, using message 360. Analysis module 320 randomly samples the received data logs (Step 400) which contains all the attributes appearing in the original mobile log data and is representative in terms of the distribution characteristics among attributes. Based on the sampled mobile log data, analysis module 320 constructs a data field metadata table (Step 410). In many embodiments, a data field metadata table may contain one row for each type of data field (with a distinct field name) appearing in the original mobile log data. Based on the sampled mobile log data, analysis module 320 constructs initial data dictionaries for complex data field types in the data field metadata table (Step 420).

In this embodiment, analysis module 320 creates an initial data dictionary that corresponds to an attribute of a complex data field, and contains all the values of the attribute that appear in the sampled mobile log data. Analysis module 320 completes the following steps to create initial data dictionaries for each complex data field.

1) Out of the sampled mobile device log data, extract all the instance data fields of the complex data field type $C_i$.
2) Extract attribute values from the instance data fields, by applying word segmentation and noise elimination techniques to filter out irrelevant information and record the number of times that an attribute value repeats.
3) For an attribute $AN_{ij}$ of $C_i$ choose those attribute values that repeat more than a predefined threshold.
4) Determine the relative priorities of the chosen attribute values of $AN_{ij}$. If attribute value $AV_1$ is compatible with or implies another attribute value $AV_2$, then $AV_1$ is considered to have a higher priority than $AV_2$. For example, in a "user-Agent" data field (""Mozilla/5.0 (Windows NT 5.1) AppleWebKit/535.2 (KHTML, like Gecko) Chrome/15.0.874.0 Safari/535.2"), the access log generated by browser "chrome" contains attribute value "safari", which indicates that "chrome" is compatible with "safari". In this case, the priority of "chrome" is higher than "safari".
5) Construct the initial data dictionary for $AN_{ij}$, with attribute values clustered by their priorities.
6) Repeat steps (3) to (5) to construct all the initial data dictionaries $\{D_{i1}, D_{i2}, \ldots, D_{in}\}$ for the complex data field type $C_i$.
7) Repeat steps (1) to (6) to construct all the initial data dictionaries for all the complex data field types $\{C_1, C_2, \ldots, C_m\}$ in the data field metadata table.

As shown, analysis module 320 then parses data records $\{R_1, R_2, \ldots, R_m\}$ contained within the original mobile log data and constructs the data field mapping table, where each row corresponds to a distinct data record with its timestamp (Step 430). Upon completion of analysis/parsing, analysis module 320 sends processed data to output module 330 using message 365. Output module 330 outputs information in message 365 as two-dimensional tables for advanced data analytics.

Figure 5:
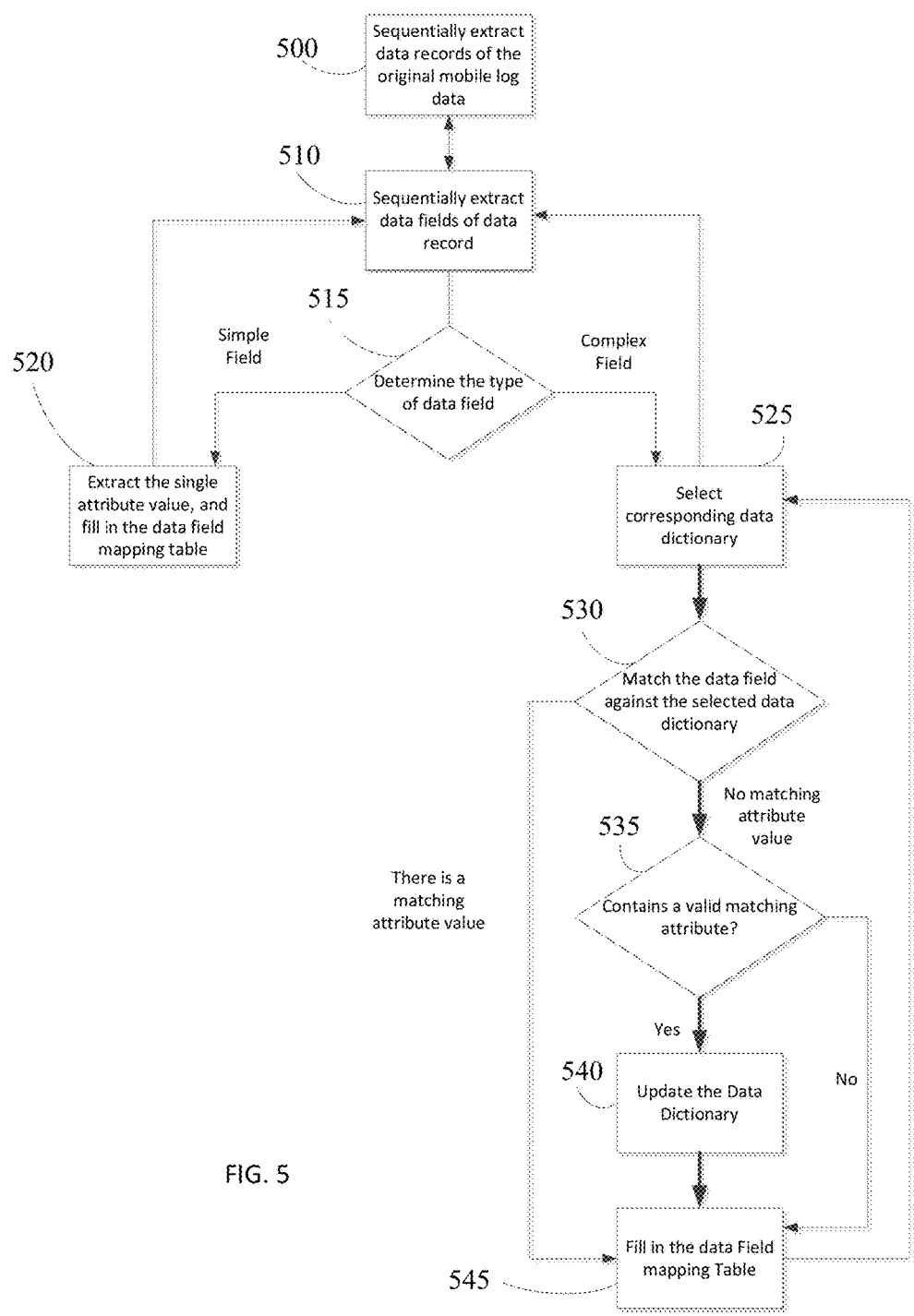
FIG. 5 is a simplified flowchart of a method of parsing mobile data logs by an analysis module within an analysis device, in accordance with an embodiment of the present disclosure.

Refer to the example embodiment of FIG. 5. FIG. 5 is a simplified flowchart of a method of parsing mobile data logs by an analysis module within an analysis device, in accordance with an embodiment of the present disclosure. As shown in FIG. 5, an analysis module sequentially extracts data records of the original mobile log data (Step 500) and extract data fields for each data record (Step 510). The analysis module determines a type of each data field (Step 515). If a data field is a simple field, an analysis module extracts the single attribute value and fills in the data field mapping table (Step 520). In most embodiments, the structure of a simple data field may be standardized and thus predefined extraction rules may be applied for attribute value exertion. Upon completion of Step 520, analysis module continues to step 510 unless all data fields of each data record in the mobile data log has been included in the data field mapping table.

If a data field is a complex field, the analysis module utilizes a corresponding data dictionary to extract attribute values. In many embodiments, complex data fields may have no standardized structure and may contain noise and/or incorrect information. The analysis module determines whether any of the data fields in the complex data field matches the selected dictionary. If an attribute matches, analysis module fills in the data field mapping table (Step 545). If an attribute does not match the data dictionary, conduct a secondary check of the attribute to determine if the attribute matches the corresponding dictionary. In many embodiments, a secondary check may be accomplished manually. If the secondary check determines that there is a matching attribute, the analysis module updates the data dictionary (Step 540) and fills in the data field mapping table (Step 545). If no matching attributes are found in the data dictionary, update the data field mapping table (Step 545) as "NULL." In many embodiments, the data dictionary may be updated if there may exist certain abstract representation rules that may apply to both P (phrase within the attribute) and some attribute values in the data dictionary, then add the rules into the data dictionary. In various embodiments, if no abstract representations apply to both P and some attribute values in the data dictionary, add P into the data dictionary. In this embodiment, an Analysis module will continue parsing the original mobile log data until the original mobile log data has been completely parsed.

Figure 6:
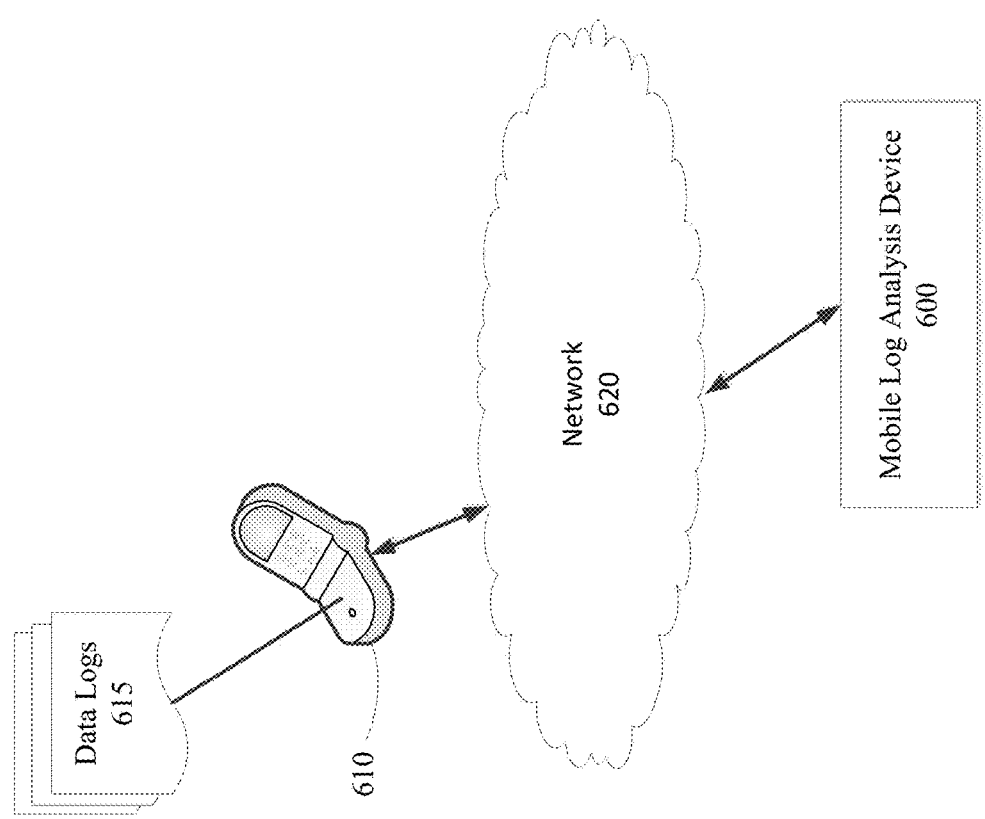
FIG. 6 is a simplified illustration of a wireless implementation of a mobile log analysis device, in accordance with an embodiment of the present disclosure.

Refer to the example embodiment of FIG. 6. FIG. 6 is a simplified illustration of a wireless implementation of a mobile log analysis device, in accordance with an embodiment of the present disclosure. In this embodiment, Mobile log analysis device 600 is in communication with network 620. Mobile device 610 is in communication with network 620. Mobile device 610 includes data logs 615. As shown, mobile log analysis device 600 is enabled to receive messages from mobile device 610 through network 620. In many embodiments, a network may include a cellular network, wireless network, and/or communication using any wireless technology.

Figure 7:
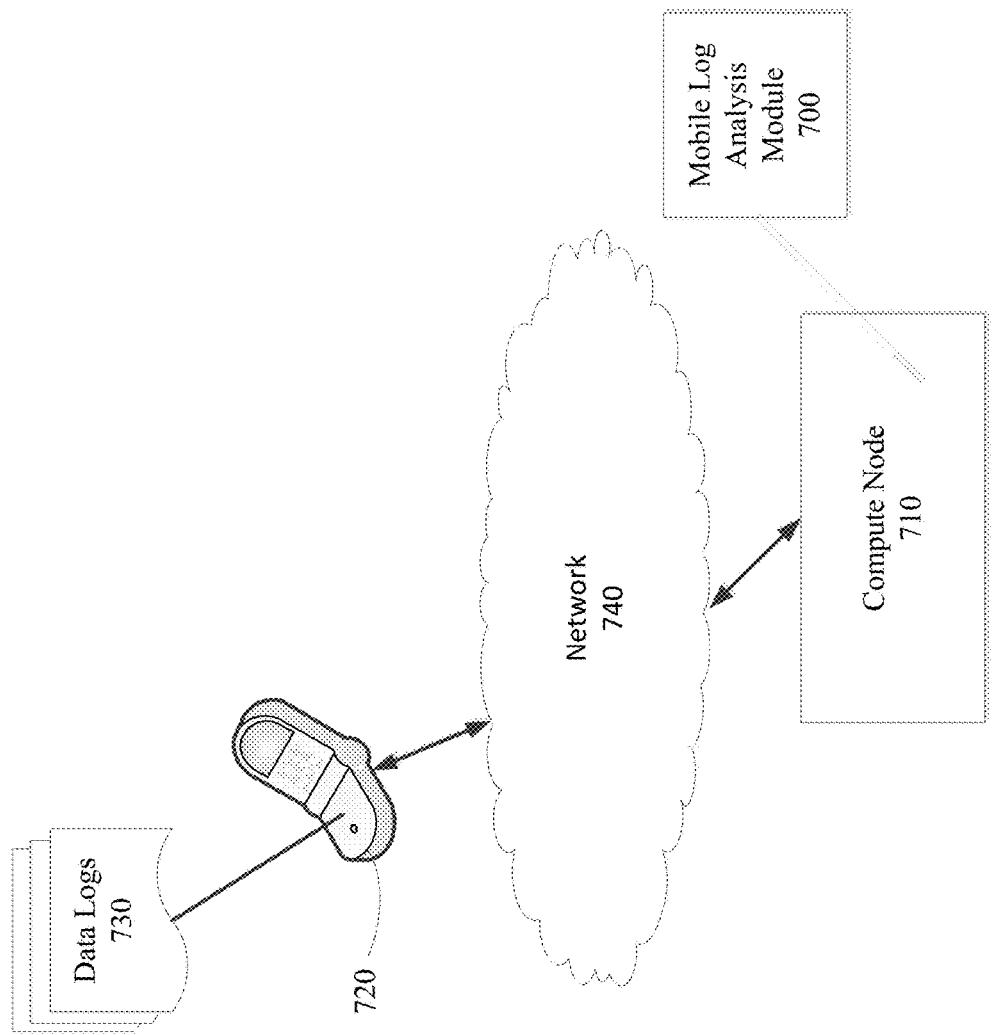
FIG. 7 is an alternate simplified illustration of a mobile log analysis module executing on a compute node, in accordance with an embodiment of the present disclosure.

Refer to the example embodiment of FIG. 7. FIG. 7 is an alternate simplified illustration of a mobile log analysis module executing on a compute node, in accordance with an embodiment of the present disclosure. As shown, mobile analysis module 700 is included within compute node 710. Compute node 710 is in communication with network 740. Mobile device 720 includes data logs 730 and mobile device 720 is in communication with network 740. In this embodiment, mobile device 720 is enabled to communicate with compute node 710 using network 740.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 8:
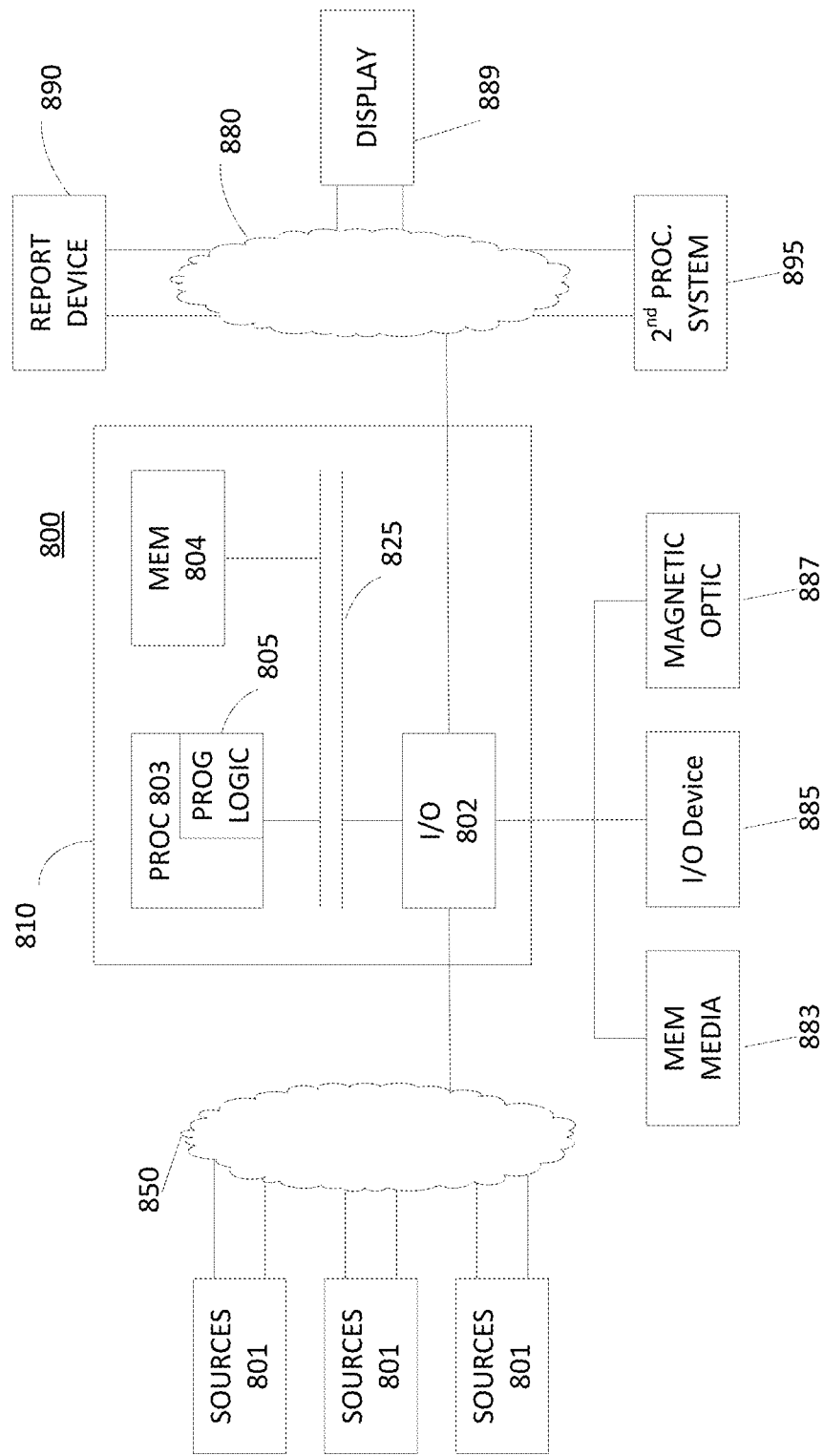
FIG. 8 is an example of an embodiment of an apparatus that may utilize the techniques described herein, in accordance with an embodiment of the present disclosure.

FIG. 8 is a block diagram illustrating an apparatus, such as a computer 810 in a network 800, which may utilize the techniques described herein according to an example embodiment of the present invention. The computer 810 may include one or more I/O ports 802, a processor 803, and memory 804, all of which may be connected by an interconnect 825, such as a bus. Processor 803 may include program logic 805. The I/O port 802 may provide connectivity to memory media 883, I/O devices 885, and drives 887, such as magnetic or optical drives. When the program code is loaded into memory 804 and executed by the computer 810, the machine becomes an apparatus for practicing the invention. When implemented on one or more general-purpose processors 803, the program code combines with such a processor to provide a unique apparatus that operates analogously to specific logic circuits. As such, a general purpose digital machine can be transformed into a special purpose digital machine.

Figure 9:
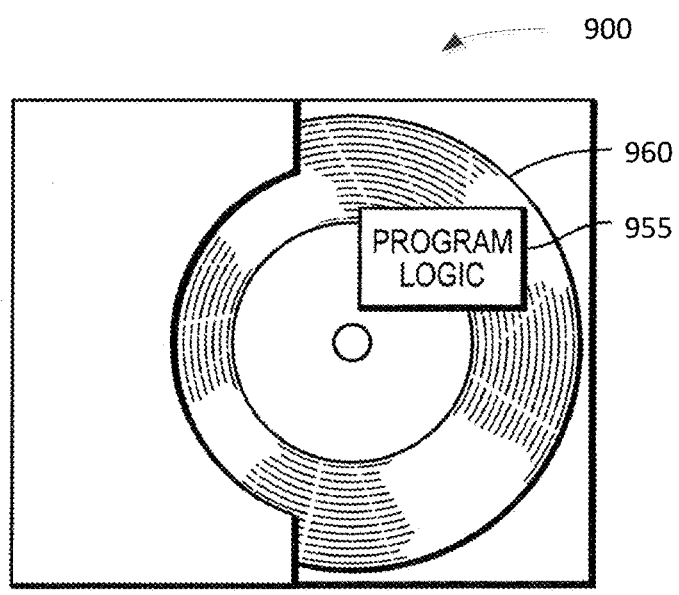
FIG. 9 is an example of a method embodied on a computer readable storage medium that may utilize the techniques described herein, in accordance with an embodiment of the present disclosure.

FIG. 9 is a block diagram illustrating a method embodied on a computer readable storage medium 960 that may utilize the techniques described herein according to an example embodiment of the present invention. FIG. 9 shows Program Logic 955 embodied on a computer-readable medium 960 as shown, and wherein the Logic is encoded in computer-executable code configured for carrying out the methods of this invention and thereby forming a Computer Program Product 900. Program Logic 955 may be the same logic 805 on memory 804 loaded on processor 803 in FIG. 8. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-9. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method for parsing a mobile device data log from a mobile device, the computer-executable method comprising:
   receiving the mobile device data log from the mobile device;
   sampling the mobile device data log to create a sampled portion of the mobile device data, wherein the sampled portion of the mobile device data is a subset of the mobile device data log which includes each attribute in the mobile device data log;
   constructing a metadata table based on the sampled portion of mobile device data;
   constructing data dictionaries based on the sampled portion of mobile device data, wherein the data dictionaries further comprise a plurality of keywords;
   parsing the mobile device data log using the metadata table and the data dictionaries to create a data field mapping table; and
   continuously updating the data dictionaries with one or more keywords based on a frequency of appearance of the keyword within the mobile device data log.

2. The computer-executable method of claim 1, wherein parsing the mobile device data log comprises:
   extracting a data record from the mobile device data log;
   extracting a data field from the data record;
   determining a type for the data field; and
   upon the determination that the type is a simple field, extracting a single attribute value and populating the data field mapping table.

3. The computer-executable method of claim 1, wherein parsing the mobile device data log further comprises:
   a. Extracting a data record from the mobile device data log;
   b. Extracting a data field form the data record;
   c. Determining a type for the data field;
   d. upon the determination that the type is a complex field, selecting a corresponding data dictionary, wherein the complex field is configured to store values of multiple attributes;
   e. comparing the data field with entries in the data dictionary; and
   f. upon the determination that there is a matching attribute value, populating the data field mapping table with the matching attribute value.

4. The computer-executable method of claim 2, wherein parsing the mobile device data log further comprises:
   conducting a secondary check to determine whether a valid matching attribute value exists;
   upon a determination that the valid matching attribute exists, updating the data dictionary with the attribute value; and
   populating the data field mapping table with the attribute value.

5. The computer executable method of claim 1 wherein the mobile device data log comprises a web access log.

6. A system, comprising:
   a mobile device, including a mobile device data log; and
   computer-executable program logic encoded in memory of one or more computers in communication with the mobile device to parse the mobile device data log from the mobile device, wherein the computer-executable program logic is configured for the execution of:
   receiving the mobile device data log from the mobile device;
   sampling the mobile device data log to create a sampled portion of mobile device data, wherein the sampled portion of mobile device data is a subset of the mobile device data log which includes each attribute in the mobile device data log;
   constructing a metadata table based on the sampled portion of the mobile device data;
   constructing data dictionaries based on the sampled portion of the mobile device data, wherein the data dictionaries further comprise a plurality of keywords;

parsing the mobile device data log using the metadata table and the data dictionaries to create a data field mapping table; and
continuously updating the data dictionaries with one or more keywords based on a frequency of appearance of the keyword within the mobile device data log.

7. The system of claim 6, wherein parsing the mobile device data log comprises:
extracting a data record from the mobile device data log;
extracting a data field from the data record;
determining a type for the data field; and
upon the determination that the type is a simple field, extracting a single attribute value and populating the data field mapping table.

8. The system of claim 6, wherein parsing the mobile device data log further comprises:
extracting a data record from the mobile device data log;
extracting a data field from the data record;
determining a type for the data field;
upon the determination that the type is a complex field, selecting a corresponding data dictionary, wherein the complex field is configured to store values of multiple attributes;
comparing the data field with entries in the data dictionary; and
upon the determination that there is a matching attribute value, populating the data field mapping table with the matching attribute value.

9. The system of claim 8, wherein parsing the mobile device data log further comprises:
conducting a secondary check to determine whether a valid matching attribute value exists;
upon a positive determination that from the secondary check, updating the data dictionary with the attribute value; and
populating the data field mapping table with the attribute value.

10. The system of claim 6 wherein the mobile device data log comprises a web access log.

11. A computer program product for parsing a mobile device data log from a mobile device, the computer program product comprising:
a non-transitory computer readable medium encoded with computer-executable program code for using read signatures in replication, the code configured to enable the execution of:
receiving the data log from the mobile device;
sampling the mobile device data log to create a sampled portion of mobile device data, wherein the sampled portion of the mobile device data is a subset of the mobile device data log which includes each attribute in the mobile device data log;
constructing a metadata table based on the sampled portion of the mobile device data;
constructing data dictionaries based on the sampled portion of the mobile device data, wherein the data dictionaries further comprise a plurality of keywords;
parsing the mobile device data log using the metadata table and the data dictionaries to create a data field mapping table; and
continuously updating the data dictionaries with one or more keywords based on a frequency of appearance of the keyword within the mobile device data log.

12. The computer program product of claim 11, wherein parsing the mobile device data log comprises:
extracting a data record from the mobile device data log;
extracting a data field from the data record;
determining a type for the data field; and
upon the determination that the type is a simple field, extracting a single attribute value and populating the data field mapping table.

13. The computer program product of claim 11, wherein parsing the mobile device data log further comprises:
extracting a data record from the mobile device data log;
extracting a data field from the data record;
determining a type for the data field
upon the determination that the type is a complex field, selecting a corresponding data dictionary, wherein the complex field is enabled to contain values of multiple attributes;
comparing the data field with entries in the data dictionary; and
upon the determination that there is a matching attribute value, populating the data field mapping table with the matching attribute value.

14. The computer program product of claim 13, wherein parsing the mobile device data log further comprises:
conducting a secondary check to determine whether a valid matching attribute value exists;
upon a determination that the valid matching attribute value exists, updating the data dictionary with the attribute value; and
populating the data field mapping table with the attribute value.

15. The computer program product of claim 11 wherein the mobile device data log comprises a web access log.

* * * * *